April 24, 1951  H. K. WALTON  2,549,950
COMBINATION PROTRACTOR AND LEVEL
Filed Aug. 31, 1948

INVENTOR.
Hurshel K. Walton
BY
McMorrow, Berman & Davidson
ATTORNEYS

Patented Apr. 24, 1951

2,549,950

UNITED STATES PATENT OFFICE 2,549,950

COMBINATION PROTRACTOR AND LEVEL

Hurshel K. Walton, Marshall, Mo.

Application August 31, 1948, Serial No. 47,077

4 Claims. (Cl. 33—88)

This invention relates to that class of measuring instruments used by carpenters, builders, cabinet makers and the like, for measuring or laying out angles and units of length, as required in their work.

A main object of the invention is to provide an instrument which combines a length scale, a protractor, a level, and a square in a single unit.

A further object of the invention is to provide a novel and improved carpenter's measuring instrument which is both sturdy in construction and easy to manipulate in use.

Further objects and advantages of my invention will become apparent from the following description and claims, and from the accompanying drawings, wherein:

Figure 1:
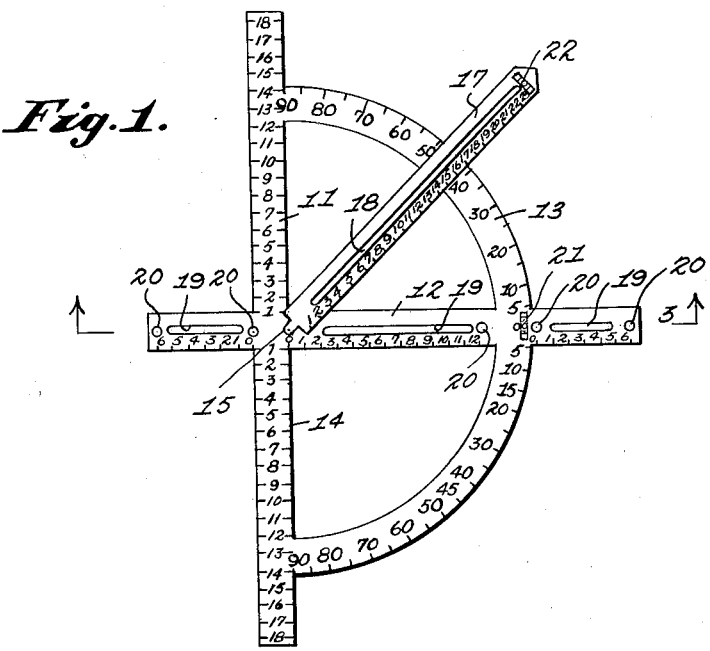
Figure 1 is a plan view of a preferred embodiment of my invention.
Figure 2:
Figure 2 is a side view of the embodiment shown in Figure 1 with the angle arm swung toward the zero degree position.
Figure 3:
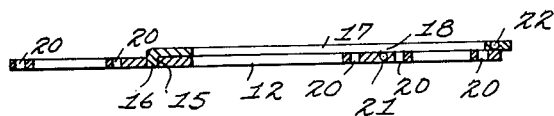
Figure 3 is a side view in section taken along the line 3—3 of Figure 1, with the angle arm in the zero degrees position.
Figure 4:
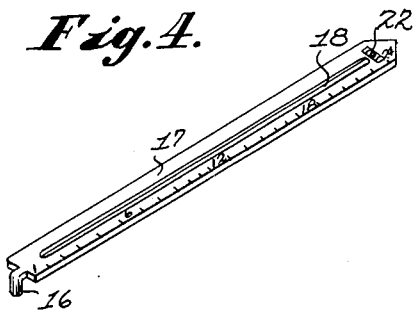
Figure 4 is a perspective view of the angle arm shown in Figure 1.

Referring to the drawings, numeral 11 indicates a straight portion of the instrument graduated in units of length, such as in inches, from the center outward to each end. Extending at right angles from portion 11 at the center thereof is another straight portion 12 which projects on either side of portion 11 and is also graduated in units of length, preferably as shown in Figure 1. Integral with members 11 and 12 is the arcuate member 13 which lies entirely outside of portion 11 and has its center of curvature in the edge 14 of portion 11. Member 13 is graduated in degrees of arc, as shown, from zero degrees to ninety degrees each way from the center of member 12.

Designated at 17 is a straight arm 17 formed with a depending stud or tongue 16. At the exact center of curvature of arcuate member 13, member 11 is formed with a hole 15 in which tongue 16 is rotatably receivable, whereby arm 17 may be pivotally rotated over member 13 to indicate angles in degrees of arc. Arm 17 is also graduated in units of length and is slotted longitudinally along its center line over most of its length to facilitate marking of the work piece by means of a crayon, pencil, scriber or the like, which can be inserted through the slot. This slot is designated by numeral 18. Similarly, slots 19 are provided along the center line of member 12. Located along the center line of member 12 are holes 20 which are identical in size with hole 15 and are so placed in relation to the length graduations on member 12 that when tongue 16 of member 17 is engaged in any one of said holes 20 and the member 17 is placed parallel to member 12 by pivotally rotating member 17 around the hole 20, the length of arm 17 can be used as an extension to that portion of the scale on member 12 nearest to which it is located.

Mounted on member 12 at the junction thereof with arcuate member 13 is a bubble level 21, said bubble level being preferably embedded in or molded into the member 12 so as to be substantially flush therewith. A similar bubble level 22 is mounted on the outer end portion of arm 17 in the same manner as the bubble level 21. The bubble levels 21 and 22 enable the instrument to be employed in measuring surfaces with respect to the horizontal or vertical.

While a specific embodiment of a carpenter's measuring instrument has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A measuring instrument comprising a first straight portion provided with graduations in units of length from the center toward each end thereof, a second straight portion disposed centrally and transversely of said first straight portion and secured thereto, said second straight portion being provided with graduations in units of length therealong and having its ends projecting beyond the opposite sides of said first straight portion, a semi-circular arcuate member positioned with its center of curvature along one side edge of said first straight portion and having its free ends secured thereto and having an intermediate portion traversing the adjacent projecting end of said second straight portion and secured thereto, said arcuate member being provided with graduations in degrees from said intermediate portion toward each of said free ends, there being a hole provided in said straight members at said center of curvature of said arcuate member, and an arm including a depending lug at one end thereof overlying said arcuate member and having said lug rotatably engaged within said hole to thereby mount said arm for movement along said arcuate member, said arm being provided with graduations in units of length.

2. A measuring instrument comprising a first straight portion provided with graduations in units of length from the center toward each end thereof, a second straight portion disposed centrally and transversely of said first straight portion and secured thereto, said second straight portion being provided with graduations in units of length therealong and having its ends projecting beyond the opposite sides of said first straight portion, a semi-circular arcuate member positioned with its center of curvature along one side of said first straight portion and having its free ends secured thereto and having an intermediate portion traversing the adjacent projecting end of said second straight portion and secured thereto, said arcuate member being provided with graduations in degrees from said intermediate portion toward each of said free ends, there being a hole provided in said straight members at said center of curvature of said arcuate member, an arm including a depending lug at one end thereof overlying said arcuate member and having said lug rotatably engaged within said hole to thereby mount said arm for movement along said arcuate member, said arm being provided with graduations in units of length, and a first level indicating means positioned contiguous to the other end of said arm and secured thereto.

3. A measuring instrument comprising a first straight portion provided with graduations in units of length from the center toward each end thereof, a second straight portion disposed centrally and transversely of said first straight portion and secured thereto, said second straight portion being provided with graduations in units of length therealong and having its ends projecting beyond the opposite sides of said first straight portion, a semi-circular arcuate member positioned with its center of curvature along one side of said first straight portion and having its free ends secured thereto and having an intermediate portion traversing the adjacent projecting end of said second straight portion and secured thereto, said arcuate member being provided with graduations in degrees from said intermediate portion toward each of said free ends, there being a hole provided in said straight members at said center of curvature of said arcuate member, an arm including a depending lug at one end thereof overlying said arcuate member and having said lug rotatably engaged within said hole to thereby mount said arm for movement along said arcuate member, said arm being provided with graduations in units of length, a first level indicating means positioned contiguous to the other end of said arm and secured thereto, and a second level indicating means positioned contiguous to the juncture of said arcuate member and said second straight portion and secured thereto.

4. A measuring instrument comprising a first straight portion provided with graduations in units of length from the center toward each end thereof, a second straight portion disposed centrally and transversely of said first straight portion and secured thereto, said second straight portion being provided with graduations in units of length therealong and having its ends projecting beyond the opposite sides of said first straight portion, a semi-circular arcuate member positioned with its center of curvature along one side edge of said first straight portion and having its free ends secured thereto and having an intermediate portion traversing the adjacent projecting end of said second straight portion and secured thereto, said arcuate member being provided with graduations in degrees from said intermediate portion toward each of said free ends, there being a hole provided in said straight members at said center of curvature of said arcuate member, and an arm including a depending lug at one end thereof overlying said arcuate member and having said lug rotatably engaged within said hole to thereby mount said arm for movement along said arcuate member, said arm being provided with graduations in units of length, said second straight portion being provided with means at spaced intervals along its length for selectively engaging said lug.

HURSHEL K. WALTON.

REFERENCES CITED

The following references are of record in the file of this patent:

UNITED STATES PATENTS

| Number | Name | Date |
|---|---|---|
| 29,133 | Barnett | July 17, 1860 |
| 200,628 | Owen | Feb. 26, 1878 |
| 223,727 | Halley | Jan. 20, 1880 |
| 411,741 | Dow | Sept. 24, 1889 |
| 418,256 | Werts | Dec. 31, 1889 |
| 780,954 | McCartney | Jan. 24, 1905 |
| 842,806 | McCausland | Jan. 29, 1907 |
| 1,290,977 | Greene | Jan. 14, 1919 |
| 1,429,999 | Barlow | Sept. 26, 1922 |
| 2,054,420 | Hochman | Sept. 15, 1936 |